US012608700B2

(12) United States Patent
Porco

(10) Patent No.: US 12,608,700 B2
(45) Date of Patent: Apr. 21, 2026

(54) CREDIT CARD FEATURES TO PREVENT SKIMMER FRAUD

(71) Applicant: The PNC Financial Services Group, Inc., Pittsburgh, PA (US)

(72) Inventor: Robert E. Porco, New Kensington, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 18/597,149

(22) Filed: Mar. 6, 2024

(65) Prior Publication Data

US 2025/0285104 A1     Sep. 11, 2025

(51) Int. Cl.
*G06Q 20/34* (2012.01)
*G06Q 20/40* (2012.01)
*G07F 7/08* (2006.01)

(52) U.S. Cl.
CPC ......... *G06Q 20/357* (2013.01); *G06Q 20/401* (2013.01); *G07F 7/0806* (2013.01)

(58) Field of Classification Search
CPC .... G06Q 20/34; G06Q 20/341; G06Q 20/357; G06Q 20/401; G07F 7/08; G07F 7/0806; G07F 7/0826
USPC ......................................... 235/492, 487, 380
See application file for complete search history.

(56) References Cited

U.S. PATENT DOCUMENTS

| | | | | |
|---|---|---|---|---|
| 6,182,894 B1 * | 2/2001 | Hackett | ............... | G06Q 20/355 |
| | | | | 235/382.5 |
| 7,210,621 B2 | 5/2007 | Woronec | | |
| 8,346,639 B2 | 1/2013 | Hammad | | |
| 8,485,437 B2 | 7/2013 | Mullen | | |
| 8,919,643 B2 | 12/2014 | Ashfield | | |
| 10,270,587 B1 | 4/2019 | Wu | | |
| 10,360,556 B2 | 7/2019 | Look | | |
| 10,438,106 B2 | 10/2019 | Breed | | |
| 10,846,700 B2 | 11/2020 | Cairns | | |
| 11,783,326 B2 | 10/2023 | Hammad | | |
| 2008/0110983 A1 * | 5/2008 | Ashfield | ............... | G07F 7/1008 |
| | | | | 235/382 |
| 2009/0173782 A1 * | 7/2009 | Muscato | .......... | G06Q 20/40975 |
| | | | | 235/379 |

(Continued)

FOREIGN PATENT DOCUMENTS

| | | | | |
|---|---|---|---|---|
| EP | 1162581 A1 * | 12/2001 | ......... | G06Q 20/3433 |
| EP | 3474207 A1 * | 4/2019 | | |

(Continued)

*Primary Examiner* — Suezu Ellis
(74) *Attorney, Agent, or Firm* — K&L Gates LLP

(57) ABSTRACT

A system can include a physical payment card, a point-of-sale card payment device for processing a payment using the physical payment card, and a card payment network in communication with the point-of-sale card payment device. The physical payment card includes embedded data and non-embedded data. Embedded data may include payment information required for processing a payment using the physical payment card, where at least a portion of the payment information is not printed visibly on the physical payment card. Non-embedded data may include a multi-character code may include at least one special character, where the multi-character code is required for processing a payment using the physical payment card.

16 Claims, 4 Drawing Sheets

(56) References Cited

U.S. PATENT DOCUMENTS

| 2016/0189127 | A1 | 6/2016 | Amarnath |
| 2020/0090161 | A1 | 3/2020 | Hay |

FOREIGN PATENT DOCUMENTS

| KR | 20120048114 | A | 5/2012 |
| TW | 202042135 | A | 11/2020 |

* cited by examiner

Front

101

109

104A → 1234 4567 8901 2333

103A → Jane Doe

105A → EXP. 08/36

100

Back

151

161 → Special-char CSC

654%#

987

163A → CVVA

157

159

100

Embedded data

104B → 1234 4567 8901 2333

105B → EXP. 08/36

103B → Jane Doe

163B → CVVB

123

171

CREDIT CARD FEATURES TO PREVENT SKIMMER FRAUD

BACKGROUND

Banks, physical payment card issuers, and other financial institutions make extensive use of various user authentication and fraud prevention mechanisms in point-of-sale systems and electronic financial transactions.

SUMMARY

This disclosure relates generally to the field of fraud prevention in point-of-sale systems and/or electronic financial transactions.

One general aspect includes a system including a physical payment card, which may include: embedded data and non-embedded data. Embedded data may include payment information required for processing a payment using the physical payment card, where at least a portion of the payment information is not printed visibly on the physical payment card. Non-embedded data may include a multi-character code may include at least one special character, where the multi-character code is required for processing a payment using the physical payment card. The system also includes a point-of-sale card payment device for processing a payment using the physical payment card. The point-of-sale card payment device may include: a reader, where the reader is to read the embedded data from the physical payment card, and a user interface to receive as an input the multi-character code.

One general aspect includes a method of processing a payment with a physical payment card. The method also includes reading, by a point-of-sale system, embedded data in an electronic format on the physical payment card; processing, by the point-of-sale system, the multi-character code; and transmitting, by the point-of-sale system, the embedded data and the multi-character code to a card payment network for processing.

One general aspect includes a method of processing a payment with a physical payment card. The method also includes receiving, by a card payment network, payment information in an electronic format based on embedded data on the physical payment card; receiving, by the card payment network, the multi-character code in an electronic format based on manual input; verifying, by the card payment network, the authenticity of a payment by the physical payment card based on the payment information and the multi-character code; and declining, by the card payment network, the payment unless the physical payment card is authenticated.

BRIEF DESCRIPTION OF THE FIGURES

The various aspects described herein, both as to organization and methods of operation, together with further objects and advantages thereof, may best be understood by reference to the following description, taken in conjunction with the accompanying drawings as follows.

Corresponding reference characters indicate corresponding parts throughout the several views. The exemplifications set out herein illustrate various disclosed embodiments, in one form, and such exemplifications are not to be construed as limiting the scope thereof in any manner.

DETAILED DESCRIPTION

Before explaining various aspects of payment systems in detail, it should be noted that the illustrative examples are not limited in application or use to the details of construction and arrangement of parts illustrated in the accompanying drawings and description. The illustrative examples may be implemented or incorporated in other aspects, variations and modifications, and may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following-described aspects, expressions of aspects, and/or examples, can be combined with any one or more of the other following-described aspects, expressions of aspects and/or examples.

In part, in one aspect, the disclosure relates to a system for payment at a physical point-of-sale system. In one aspect, payment at physical point-of-sale systems may be susceptible to 'skimming' devices that capture payment information and enable a criminal or other unauthorized user to make additional, unauthorized transactions. In part, the system for payment as disclosed herein is designed to thwart potential skimming and prevent capture of payment information at a point-of-sale system. Various embodiments of the disclosure, such as the system for payment designed to thwart skimming, comprise a card payment network and a physical payment card. In various embodiments, the physical payment card comprises embedded data and non-embedded data, wherein embedded data may be encoded in a non-visual or human-non-readable medium such as in a chip or magnetic strip, and wherein non-embedded data may be encoded in a visual or human-readable medium such as in printed characters on the physical payment card. In many embodiments, a skimming device may be operable to capture embedded data or additional data entered at a point-of-sale system by a user of the physical payment card, and in many embodiments, the non-embedded data of the physical payment card of the system for payment designed to thwart skimming disclosed herein may comprise information that is not able to be captured or encoded by a skimming device. In some embodiments of the disclosure, such information not able to be captured or encoded by a skimming device may comprise a code with at least one 'special character' such as a non-numeric character, a non-alphanumeric character, or a character not included in conventional small character maps.

Figures 1A, 1B:
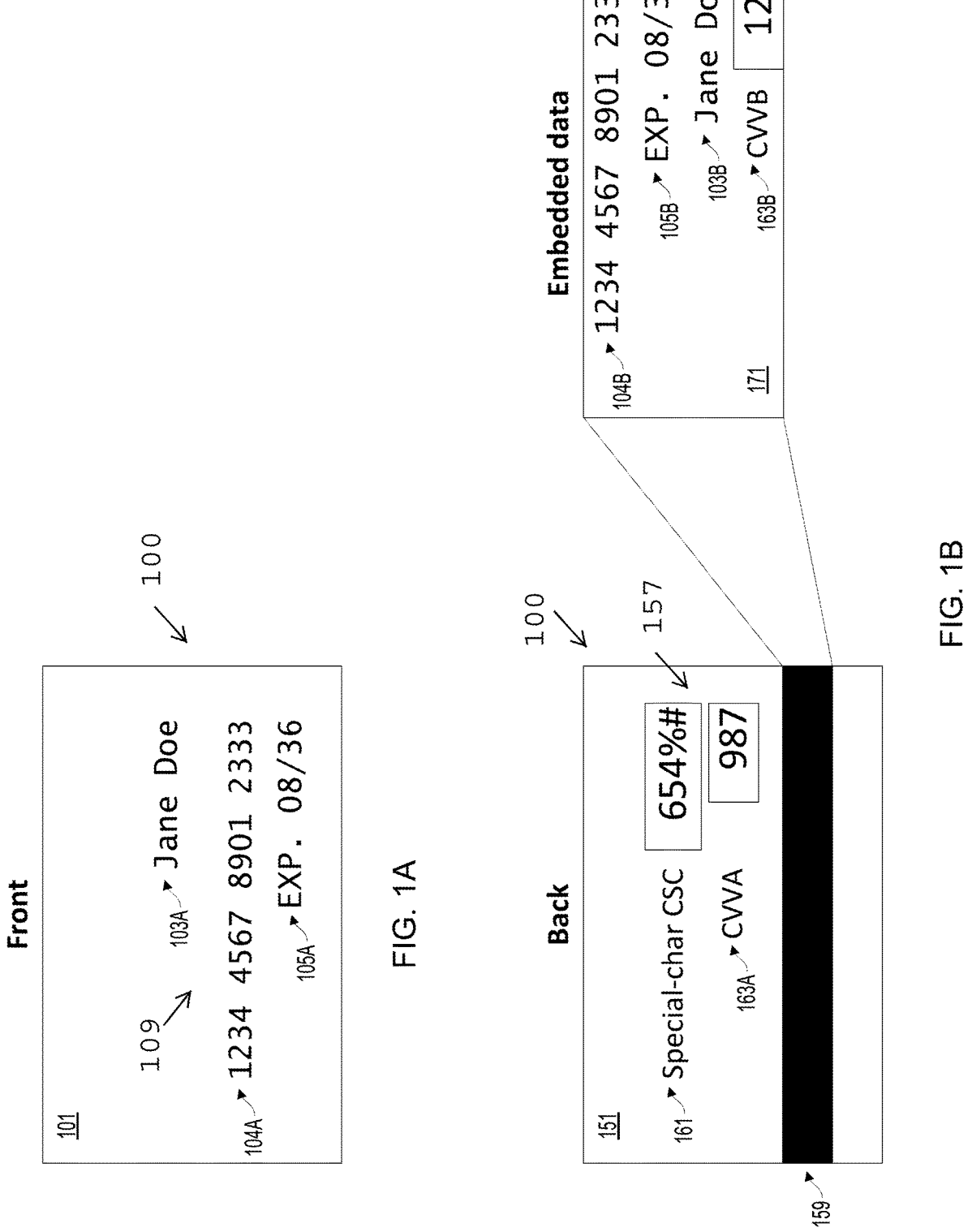
FIG. 1A is a diagram of a first side of a physical payment card, according to an exemplary embodiment of the present disclosure.
FIG. 1B is a diagram of a second side of the physical payment card of FIG. 1A and further depicting data embedded within the physical payment card for illustrative purposes, according to an exemplary embodiment of the disclosure.

Referring now to the exemplary embodiment of FIG. 1A, a diagram of a first side 101 of a physical payment card 100 is shown. The first side 101 of the card 100 comprises various non-embedded data 109, such as a name 103A of a user to whom the physical payment card 100 was issued, an account number 104A of the physical payment card 100, and an expiration date 105A of the physical payment card 100.

Referring now to the exemplary embodiment of FIG. 1B, a diagram of a second side 151 of the physical payment card 100 is shown. FIG. 1B further depicting data embedded within the physical payment card for illustrative purposes. In various embodiments, the second side 151 of the physical payment card 100 comprises various non-embedded data 157 and various embedded data 171. In some embodiments, the non-embedded data 157 on the second side 151 of the physical payment card 100 comprises a multi-character card security code (CSC) 161 and a first card verification value (CVV) 163A. In many embodiments, a CSC 161 comprises at least one special character, such as a non-numeric or non-alphanumeric character. In various embodiments, the at least one character that may not be available in a small character map. For example, in many embodiments, the at least one special character may be a character not present in an ASCII character encoding, an ISO-8859-1 character encoding, or other conventional 7-bit or 8-bit character encoding. In some embodiments, the CSC 161 may be entered into a point-of-sale system during a transaction, or the CVV 163A may be entered into a point-of-sale system during a transaction, or both the CSC 161 and the CVV 163A may be entered into a point-of-sale system during a transaction. In other embodiments, the CSC 161, the CVV 163A, or both the CSC 161 and the CVV 163A may be entered into a user interface during a card-not-present transaction, such as a transaction conducted via a website.

In at least one embodiment, such as the embodiment of FIG. 1B, the second side 151 of the physical payment card 100 comprises a magnetic strip 159 that comprises the embedded data 171. In various embodiments of the disclosure, the embedded data comprises the account number 104B of the physical payment card, the expiration date of the physical payment card 105B, and the name 103A of a user to whom the physical payment card was issued. In various embodiments, the embedded data further comprises a CVV 163B. In some embodiments, the CVV 163B in the embedded data 171 is not equal to the CVV 163A in the non-embedded data on the second side 151 of the physical payment card 100.

In several embodiments, the various non-embedded data on the first side of the physical payment card or on the second side of the physical payment card are in a human-readable or visual format. In many embodiments, the various non-embedded data on the first side or on the second side of the physical payment card are printed or stamped on the physical payment card.

Figure 2:
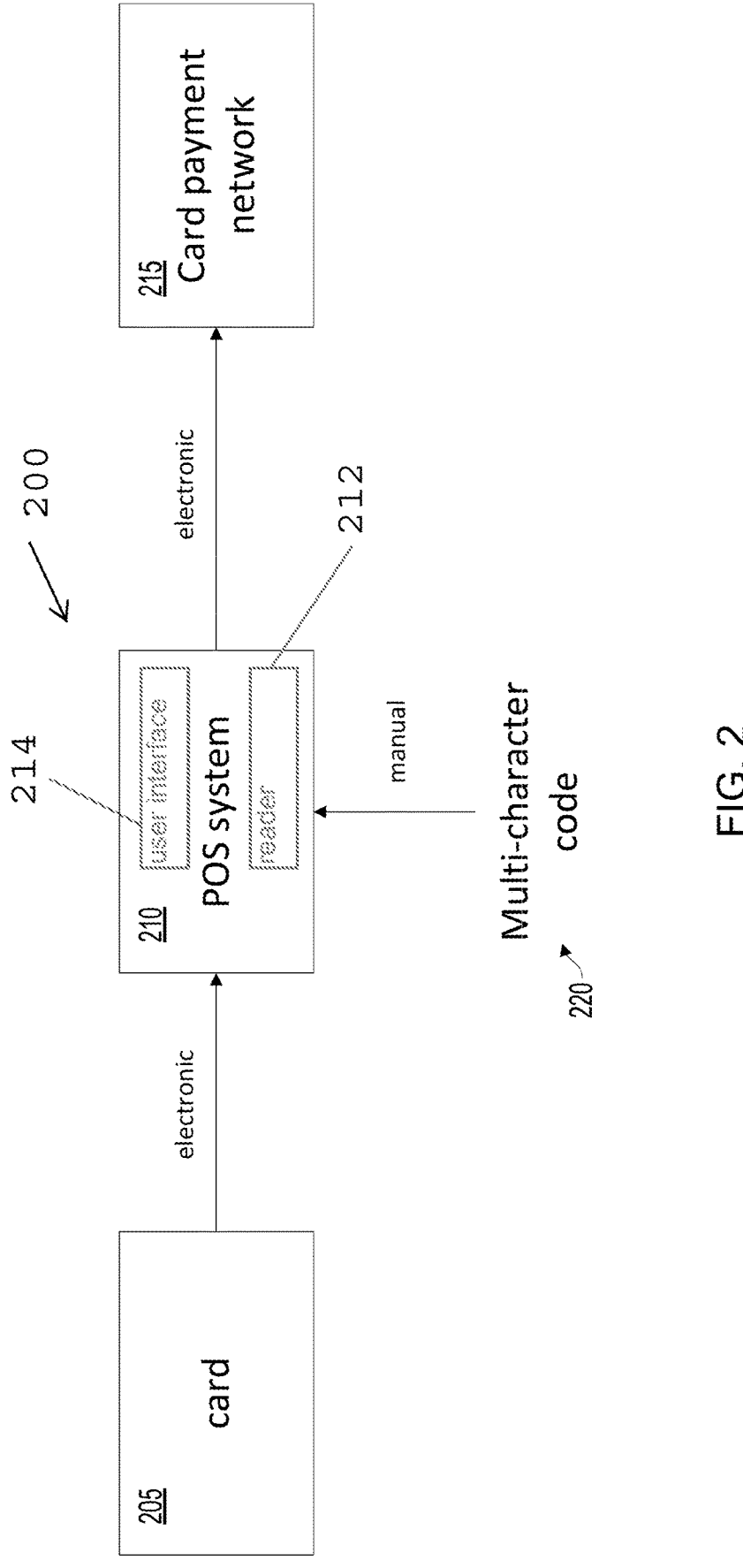
FIG. 2 is a block diagram of a system operable to process a payment with a physical payment card and a manually-entered multi-character code, according to an exemplary embodiment of the disclosure.

Referring now to the exemplary embodiment of FIG. 2, a block diagram of a system 200 operable to process a payment with a physical payment card and a manually-entered multi-character code is shown. In various embodiments of the disclosure, the system 200 comprises a physical payment card 205, which is similar to the card 100 (FIGS. 1A and 1B), a point-of-sale (POS) system 210, and a card payment network 215. The physical payment card 205 interacts or otherwise communicates with a POS system 210. The POS comprises a computing device. In some embodiments, the POS system 210 may read the embedded data in the physical payment card via a chip reader 214, a magnetic reader, or by other means. In various embodiments, a user manually enters a multi-character code 220 comprising at least one special character into the POS system 210 via a user interface 212 during the transaction. For example, the multi-character code 220 can correspond to the CSC 161 on the card 100 (FIG. 1B). Finally, in various embodiments, the POS system 210 interacts with the card payment network 215 via some electronic or other means of telecommunication.

Figure 3:
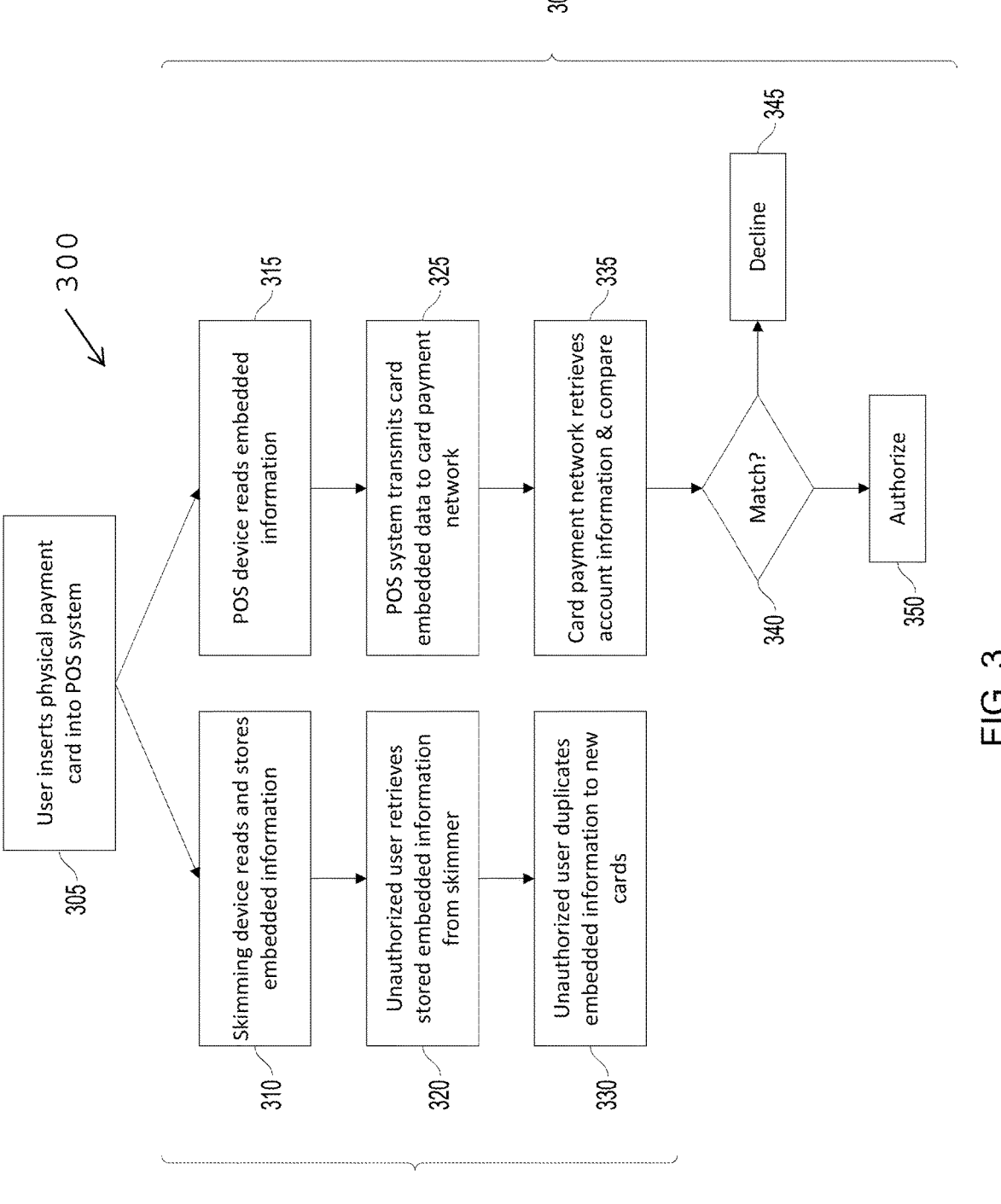
FIG. 3 is a flow chart of a method in which a card skimmer device intercepts data embedded on a physical payment card during a payment utilizing the physical payment card, according to an exemplary embodiment of the disclosure.

Referring now to the exemplary embodiment of FIG. 3, a flow chart 300 of a payment method is depicted. In the method, a user inserts 305 a physical payment card into a POS system, such as the POS system 210 (FIG. 2), for example, after which two parallel processes 301, 302 occur. In a first process 301, a skimming device surreptitiously installed onto the POS system reads 310 embedded data from the physical payment card and stores the read embedded data in a local storage media. Embedded data read by the skimming device comprises an authorized user's name, a card account number, a card expiration date, a card verification value, or other data. The embedded data read by the skimming device in the first process 301 can correspond to the embedded data 171 (FIG. 1B). Furthermore, an unauthorized user, or criminal, later retrieves the various stored information, which under ordinary circumstances may be sufficient to duplicate 330 a physical payment card and/or the payment information thereof to make additional, unauthorized transactions.

While the skimming device reads and stores 310 embedded data on a physical payment card, an authorized transaction occurs simultaneously via the second process 302. The POS system similarly reads 315 the embedded data from the physical payment card and transmits 325 the embedded data to the card payment network. Finally, the card payment network retrieves 335 account information associated with a card account number and compares 340 all embedded data transmitted by the POS device with account information held by the card payment network. If transmitted data matches with account information held by the card payment network, a transaction is authorized 350 and initiated, otherwise, the transaction is declined 345. In various embodiments of the disclosure, a user's interaction with the POS system may further comprise the entering of additional authenticating information into the POS system, such as a ZIP code, a personal identification number, or a card verification value. In various embodiments, a skimming device may have limited capacity to read or store additional, manually entered authenticating information, or may have limited capacity to read or store additional, manually entered authenticating information that contains a special character, such as a non-numeric, non-alphanumeric, or other character outside of small or conventional character encodings.

Figure 4:
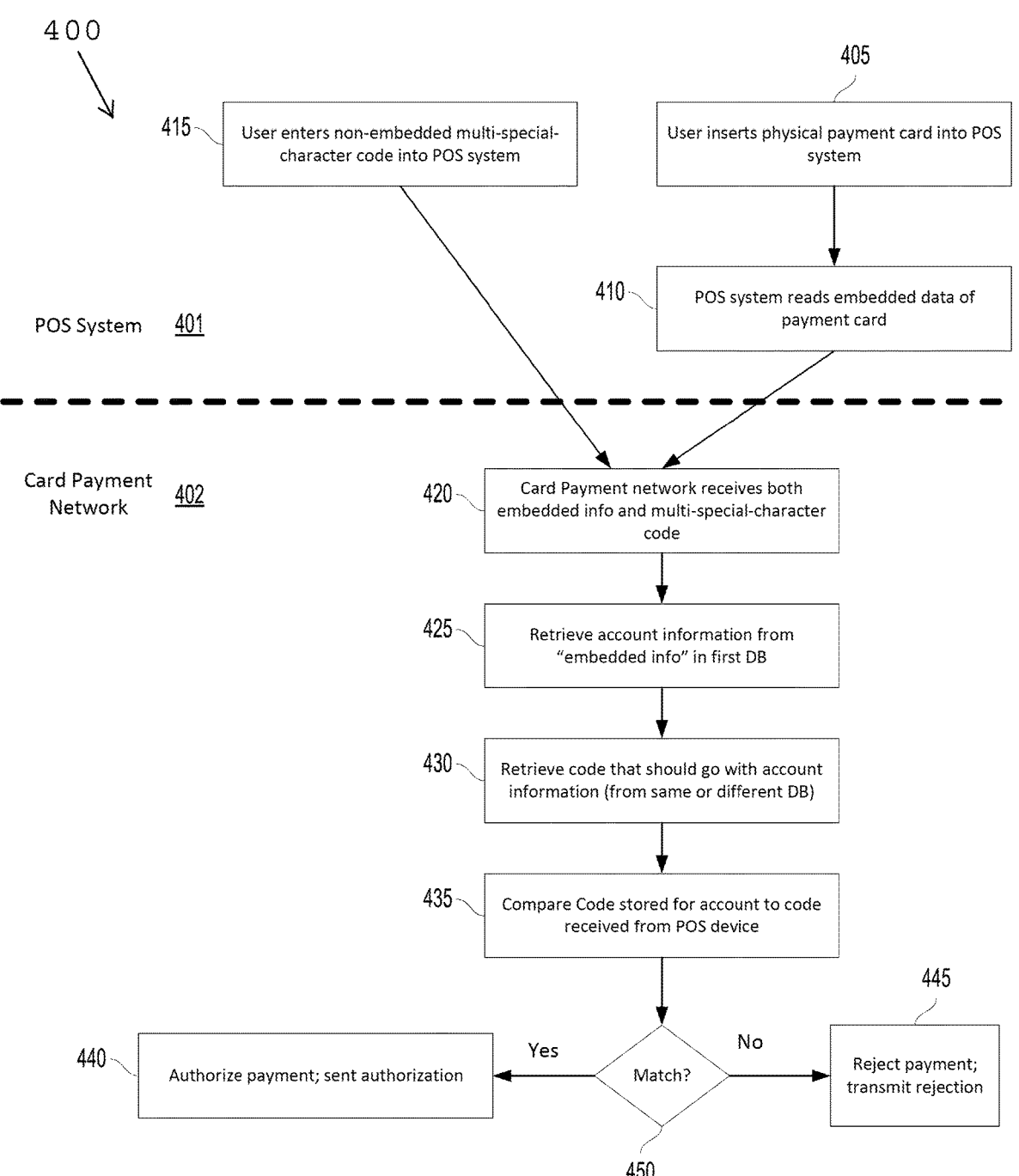
FIG. 4 is a flow chart of a method of processing a payment with a physical payment card at a point-of-sale system, wherein the method comprises authenticating a card user by a multi-character code submitted at the point-of-sale system, according to an exemplary embodiment of the disclosure.

Referring now to the exemplary embodiment of FIG. 4, a flow chart 400 of a method of processing a payment with a physical payment card at a point-of-sale system is depicted. In the method of FIG. 4, a card user is authenticated by a multi-character code submitted at the point-of-sale system to prevent a skimming device from obtaining certain payment information required from processing a payment with the physical payment card. The flow chart 400 comprises a set of steps occurring on a POS system 401, such as the POS system 210 (FIG. 2), for example, and a set of steps occurring in a card payment network 402, such as the card payment network 215 (FIG. 2), for example. In various embodiments, a user inserts 405 a physical payment card into a POS system and the POS system reads 410 embedded data from the physical payment card. Concurrently, in many embodiments of the disclosure, a user enters 415 a multi-character card security code comprising at least one special character, such as the CSC 161 (FIG. 1B), for example, into the POS system. In many embodiments, the card payment network then receives 420 both the embedded data, such as the embedded data 171 (FIG. 1B), for example, read by the POS system and the multi-character code (e.g. CSC 161) entered manually into the POS system by the user. Furthermore, in various embodiments, the card payment network then retrieves 425 account information from the embedded data in a database. The card payment network 402 further retrieves 430 the multi-character code associated with the physical payment card and account information. Finally, in various embodiments, the card payment network 402 compares 435 the multi-character code containing at least one special character transmitted by the user via the POS system with the multi-character code as retrieved in the database. If the transmitted code and the retrieved code match 450, a transaction is authorized 440. Otherwise, the transaction is declined 445.

In various instances, the multi-character card security card comprising at least one special character can be embedded in a quick response (QR) code. For example, the quick response code can be printed on the physical payment card. In such instances, to retrieve the multi-character code, a user can scan or image the quick response code with a QR scanner (e.g. a mobile, digital device with a camera) to receive a link to the card-specific, or user-specific multi-character code, which can then be manually input to the POS system to effect the transaction. The QR code may point to a URL from which the mobile device receives the code for display to the recipient. In certain instances, the bank issuing the multi-character code can update the multi-character code on a regular basis (e.g. daily, weekly, quarterly) and/or sporadically and/or based on the identification of suspicious activity associated with the user's account. In various instances, the multi-character code can be updated during the life or term of the physical payment card. Stated differently, the multi-character code can be updated at least once prior to the expiration date of the physical payment card. In such instances, the updated, i.e. new or latest, multi-character code can be required along with the payment information to authenticate a transaction, which can further ensure that the payment information was not compromised and the payment is not fraudulent. The card payment network can confirm the updated multi-character code is provided before authorizing a payment with the physical payment card.

In various instances, the multi-character card security code comprising at least one special character can be embedded in a NFC chip. For example, the NFC chip can be placed as a sticker on the physical card or it could be embedded into the physical card. The user can scan the NFC chip with a NFC reader (e.g. a mobile, digital device with a camera), which displays the code for the recipient on the NFC reader (e.g., the screen of the mobile device).

In various instances, the multi-character card security code can be encrypted, or otherwise secured, in a database along with the payment information for a user. In various instances, the codes are stored in a Nacha-compliant database. For example, the codes can be encrypted; commercially reasonable encryption technology can be utilized for all transmission of data to and/or from the system via an unsecured network (e.g. the Internet). In various aspects, the codes are stored in the compliant database in an electronic format in which such data is unreadable at rest. The data can be encrypted with at least 128-bit encryption protocols and, in other instances, at least 256-bit encryption. For example, 128-bit or 256-bit advanced encryption system (AES), SSL or RSA encryption could be employed for the database(s) storing the codes and their associated affiliations.

The database can be stored locally on servers internal to the financial institution or remote to the financial institution. Alternatively or additionally, the database can be stored in a cloud-based storage solution. Any suitable storage method is envisioned that reliably stores the information while allowing an authorized user from the financial institution to readily access the information.

Examples

Clause 1—A system, comprising a physical payment card and a point-of-sale payment device for processing a payment using the physical payment card. The physical payment card comprises embedded data comprising payment information required for processing a payment using the physical payment card, wherein at least a portion of the payment information is not printed visibly on the physical payment card. The physical payment card further comprises non-embedded data comprising a multi-character code comprising at least one special character, wherein the multi-character code is required for processing a payment using the physical payment card. The point-of-sale card payment device comprises a reader, wherein the reader is to read the embedded data from the physical payment card. The point-of-sale card payment device further comprises a user interface to receive as an input the multi-character code.

Clause 2—The system of clause 1, further comprising a card payment network in communication with the point-of-sale card payment device, wherein the card payment network comprises one or more servers to: receive the payment information and the multi-character code from the point-of-sale card payment device; authenticate the payment information based on the multi-character code; and transmit authentication of the payment to the POS card payment device.

Clause 3—The system of any of clauses 1 and 2, wherein the embedded data is encoded on a magnetic strip, and wherein the reader comprises a magnetic strip reader.

Clause 4—The system of any of clauses 1 and 2, wherein the embedded data is encoded on a chip, and wherein the reader comprises a chip reader.

Clause 5—The system of any of clauses 1, 2, 3, and 4, wherein the physical payment card comprises a card selected from a group consisting of a credit card, a debit card, and a gift card.

Clause 6—The system of any of clauses 1, 2, 3, 4, and 5, wherein the user interface comprises a keyboard.

Clause 7—The system of any of clauses 1, 2, 3, 4, 5, and 6, wherein the user interface comprises a touchpad.

Clause 8—The system of any of clauses 1, 2, 3, 4, 5, 6, and 7, wherein the user interface comprises a number pad.

Clause 9—The system of any of clauses 1, 2, 3, 4, 5, 6, 7, and 8, wherein the multi-character code is visibly printed on the physical payment card.

Clause 10—The system of any of clauses 1, 2, 3, 4, 5, 6, 7, 8, and 9, wherein the physical payment card further comprises a quick-response code, wherein at least a portion of the non-embedded data is encoded in the quick-response code, and wherein the portion of the non-embedded data is updated during the term of the physical payment card.

Clause 9—A method of processing a payment with a physical payment card, the physical payment card comprising embedded data and a multi-character code separate and distinct from the embedded data, wherein the multi-character code comprises at least one special character, the method comprising reading, by a point-of-sale system, the embedded data in an electronic format on the physical payment card; processing, by the point-of-sale system, the multi-character code; and transmitting, by the point-of-sale system, the embedded data and the multi-character code to a card payment network for processing.

Clause 10—The method of clause 9, further comprising receiving, by the point-of-sale system, an authentication from the card payment network based on the processing of the embedded data and the multi-character code.

Clause 11—The method of any of clauses 9 and 10, wherein the multi-character code is encoded in a quick-response code, the method further comprising scanning, by the point-of-sale system, the quick-response code to obtain the multi-character code.

Clause 12—The method of any of clauses 9, 10, and 11, further comprising receiving, by the point-of-sale system, an authentication from the card payment network based on the processing of the embedded data and the multi-character code.

Clause 13—The method of any of clauses 9, 10, 11, and 12, wherein the multi-character code is encoded in a quick-response code, the method further comprising scanning, by the point-of-sale system, the quick-response code to obtain the multi-character code.

Clause 14—The method of any of clauses 9, 10, 11, 12, and 13, further comprising manually inputting the multi-character code into the point-of-sale system.

Clause 15—The method of any of clauses 9, 10, 11, 12, 13, and 14, wherein the embedded data and the multi-character code are transmitted separately.

Clause 16—A method of processing a payment with a physical payment card, the physical payment card comprising embedded data and a multi-character code separate and distinct from the embedded data, wherein the multi-character code comprises at least one special character, the method comprising: receiving, by a card payment network, payment information in an electronic format based on the embedded data on the physical payment card; receiving, by the card payment network, the multi-character code in an electronic format based on manual input; verifying, by the card payment network, the authenticity of a payment by the physical payment card based on the payment information and the multi-character code; and declining, by the card payment network, the payment unless the physical payment card is authenticated.

Clause 17—The method of clause 16, wherein the payment information and the multi-character code are received separately by the card payment network.

Clause 18—The method of any of clauses 16 and 17, wherein verifying the authenticity of the payment comprises ensuring the multi-character code corresponds to the payment information.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those examples may occur to persons skilled in the art with attainment of at least some of the advantages. The disclosed examples are therefore intended to include all such modifications, alterations, and adaptations without departing from the scope of the embodiments as set forth herein.

The foregoing detailed description has set forth various forms of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, and/or examples can be implemented, individually and/or collectively, by a wide range of hardware, software, firmware, or virtually any combination thereof. Those skilled in the art will recognize that some aspects of the forms disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as one or more program products in a variety of forms, and that an illustrative form of the subject matter described herein applies regardless of the particular type of signal bearing medium used to actually carry out the distribution.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

Any of the software components or functions described in this application, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as RAM, ROM, a magnetic medium such as a hard-drive or a floppy disk, or an optical medium such as a CD-ROM. Any such computer readable medium may reside on or within a single computational apparatus, and may be present on or within different computational apparatuses within a system or network.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one aspect of a bus. Transmission media can also take the form of acoustic or light waves, such as those generated during radio frequency (RF) and infrared (IR) data communications. Common forms of computer-readable media include, for example, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH EPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++, or the like and conventional procedural programming languages, such as the "C" programming language, Go, Python, or other programming languages, including assembly languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some further descriptions of terms used herein are provided below.

The terms "digital device" and "user device" refer to any electronic device that is configured to communicate with one or more servers or remote devices and/or systems. A client device or a user device may include a mobile device, a network-enabled appliance (e.g., a network-enabled television, refrigerator, thermostat, and/or the like), a computer, a POS system, and/or any other device or system capable of communicating with a network. A client device may further include a desktop computer, laptop computer, mobile computer (e.g., smartphone), a wearable computer (e.g., a watch, pair of glasses, lens, clothing, and/or the like), a cellular phone, a network-enabled appliance (e.g., a network-enabled television, refrigerator, thermostat, and/or the like), a point-of-sale (POS) system, and/or any other device, system, and/or software application configured to communicate with a remote device or system. A client or user device may also include an access device as defined in this application.

As used herein, the term "communication" and "communicate" may refer to the reception, receipt, transmission, transfer, provision, and/or the like of information (e.g., data, signals, messages, instructions, calls, commands, and/or the like). A communication may use a direct or indirect connection and may be wired and/or wireless in nature. As an example, for one unit (e.g., a device, a system, a component of a device or system, combinations thereof, and/or the like) to communicate with another unit means that the one unit is able to directly or indirectly receive information from and/or transmit information to the other unit. The one unit may communicate with the other unit even though the information may be modified, processed, relayed, and/or routed between the one unit and the other unit. In one example, a first unit may communicate with a second unit even though the first unit receives information and does not communicate information to the second unit. For example, a first unit may be in communication with a second unit even though the first unit passively receives data and does not actively transmit data to the second unit. As another example, a first unit may communicate with a second unit if an intermediary unit (e.g., a third unit located between the first unit and the second unit) receives information from the first unit, processes the information received from the first unit to produce processed information, and communicates the processed information to the second unit. In some non-limiting embodiments or aspects, a message may refer to a packet (e.g., a data packet, a network packet, and/or the like) that includes data. It will be appreciated that numerous other arrangements are possible.

As used herein, the term "computing device" or "computer device" may refer to one or more electronic devices that are configured to directly or indirectly communicate with or over one or more networks. A computing device may be a mobile device, a desktop computer, and/or the like. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. The computing device may not be a mobile device, such as a desktop computer. Furthermore, the term "computer" may refer to any computing device that includes the necessary components to send, receive, process, and/or output data, and normally includes a display device, a processor, a memory, an input device, a network interface, and/or the like.

A payment network may include a packet switched network. The communication devices may be capable of communicating with each other using a selected packet switched network communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

As used herein, the term "server" may include one or more computing devices which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. The term "server" may also refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices may constitute a "system".

Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

A "server computer" may typically be a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "user" may include an individual. In some embodiments or aspects, a user may be associated with one or more personal accounts and/or mobile devices.

Unless specifically stated otherwise as apparent from the foregoing disclosure, it is appreciated that, throughout the present disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," "an embodiment", "one embodiment," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

What is claimed is:

1. A system comprising:
   a physical payment card, comprising:
   embedded data comprising payment information, wherein at least a portion of the payment information is not printed visibly on the physical payment card; and
   non-embedded data comprising a multi-character code comprising at least one special character, wherein the at least one special character comprises a non-alphanumeric character:

a point-of-sale card payment device for processing a payment using the physical payment card, the point-of-sale card payment device comprising:

a reader, wherein the reader is to read the embedded data from the physical payment card; and a user interface to receive as an input the multi-character code, wherein both the embedded data read by the reader and the multi-character code input to the user interface are required at a point-of-sale for processing the payment using the physical payment card; and a card payment network in communication with the point-of-sale card payment device and a remote database storing a code associated with the physical payment card, wherein the card payment network comprises one or more servers to:

receive both the payment information and the multi-character code from the point-of-sale card payment device;

retrieve the stored code associated with the physical payment card based on the received payment information;

authenticate the payment information based on both the multi-character code input to the user interface matching the stored code associated with the physical payment card; and transmit authentication of the payment to the point-of-sale card payment device.

2. The system of claim 1, wherein the embedded data is encoded on a magnetic strip, and wherein the reader comprises a magnetic strip reader.

3. The system of claim 1, wherein the embedded data is encoded on a chip, and wherein the reader comprises a chip reader.

4. The system of claim 1, wherein the physical payment card comprises a card selected from a group consisting of a credit card, a debit card, and a gift card.

5. The system of claim 1, wherein the user interface comprises a keyboard.

6. The system of claim 1, wherein the user interface comprises a touchpad.

7. The system of claim 1, wherein the user interface comprises a number pad.

8. The system of claim 1, wherein the multi-character code is visibly printed on the physical payment card.

9. A system comprising:

a physical payment card, comprising:

embedded data comprising payment information, wherein at least a portion of the payment information is not printed visibly on the physical payment card; and non-embedded data comprising a multi-character code comprising at least one special character, wherein the at least one special character comprises a non-alphanumeric character;

a point-of-sale card payment device for processing a payment using the physical payment card, the point-of-sale card payment device comprising:

a reader, wherein the reader is to read the embedded data from the physical payment card; and a user interface to receive as an input the multi-character code, wherein both the embedded data read by the reader and the multi-character code input to the user interface are required at a point-of-sale for processing the payment using the physical payment card; and wherein the physical payment card further comprises a quick-response code printed on the physical payment card, wherein at least a portion of the non-embedded data is encoded in the quick-response code, and wherein the portion of the non-embedded data is updated during a term of the physical payment card.

10. A method of processing a payment with a physical payment card, the physical payment card comprising embedded data and a multi-character code, wherein the multi-character code is separate and distinct from the embedded data and is obtainable by possession of the physical payment card, wherein the multi-character code comprises at least one special character, and wherein the at least one special character comprises a non-alphanumeric character, the method comprising:

reading, by a point-of-sale system, the embedded data in an electronic format on the physical payment card;

receiving, by the point-of-sale system, the multi-character code by a manual input;

processing, by the point-of-sale system, the multi-character code; and transmitting, by the point-of-sale system, the embedded data and the multi-character code to a card payment network for processing, wherein both the embedded data and the multi-character code are required at the point-of-sale system for processing the payment using the physical payment card; and receiving, by the point-of-sale system, an authentication from the card payment network based on the multi-character code received by the point-of-sale system matching a stored code associated with the physical payment card and retrieved from a remote database based on the embedded data read from the physical payment card by the point-of-sale system.

11. The method of claim 10, further comprising manually inputting the multi-character code into the point-of-sale system.

12. The method of claim 10, wherein the embedded data and the multi-character code are transmitted separately.

13. A method of processing a payment with a physical payment card, the physical payment card comprising embedded data and a multi-character code, wherein the multi-character code is separate and distinct from the embedded data and is obtainable by possession of the physical payment card, wherein the multi-character code comprises at least one special character, and wherein the at least one special character comprises a non-alphanumeric character, further the method comprising:

reading, by a point-of-sale system, the embedded data in an electronic format on the physical payment card;

receiving, by the point-of-sale system, the multi-character code by a manual input, wherein the multi-character code is encoded in a quick-response code printed on the physical payment card;

processing, by the point-of-sale system, the multi-character code; and transmitting, by the point-of-sale system, the embedded data and the multi-character code to a card payment network for processing, wherein both the embedded data and the multi-character code are required at the point-of-sale system for processing the payment using the physical payment card; the method further comprising:

scanning, by the point-of-sale system, the quick-response code to obtain the multi-character code.

14. A method of processing a payment with a physical payment card, the physical payment card comprising embedded data and non-embedded data, wherein the non-embedded data is obtainable by possession of the physical payment card at a point-of-sale, wherein the non-embedded data comprises a multi-character code separate and distinct from the embedded data, wherein the multi-character code comprises at least one special character, and wherein the at least one special character comprises a non-alphanumeric character, the method comprising:

receiving, by a card payment network, payment information in an electronic format based on the embedded data on the physical payment card;

receiving, by the card payment network, the multi-character code in an electronic format based on manual input;

verifying, by the card payment network, authenticity of a payment by the physical payment card based on both the payment information and the multi-character code, wherein verifying authenticity of the payment by the physical payment card comprises seeking a stored code associated with the physical payment card and retrieved from a remote database based on the embedded data received by the card payment network that matches the multi-character code; and declining, by the card payment network, the payment unless the physical payment card is authenticated.

15. The method of claim 14, wherein the payment information and the multi-character code are received separately by the card payment network.

16. The method of claim 14, wherein verifying the authenticity of the payment comprises ensuring the multi-character code corresponds to the payment information.

* * * * *